United States Patent [19]

Kimura

[11] Patent Number: 5,678,401
[45] Date of Patent: Oct. 21, 1997

[54] ENERGY SUPPLY SYSTEM UTILIZING GAS AND STEAM TURBINES

[76] Inventor: Shigeaki Kimura, 2-120, 35-1, Oshitate-cho 1-chome, Fuchu-shi, Tokyo, Japan

[21] Appl. No.: 549,308

[22] Filed: Oct. 27, 1995

[30] Foreign Application Priority Data

Apr. 25, 1995 [JP] Japan .................... 7-101136

[51] Int. Cl.$^6$ ........................................ F02C 6/18
[52] U.S. Cl. ......................... 60/39.182; 60/39.183
[58] Field of Search ............... 60/39.07, 39.183, 60/266, 267, 39.182

[56] References Cited

U.S. PATENT DOCUMENTS

| | | | |
|---|---|---|---|
| 2,591,676 | 4/1952 | Clayton | 60/266 |
| 3,659,417 | 5/1972 | Grieb | 60/39.183 |
| 4,503,666 | 3/1985 | Christoff | 60/39.183 |
| 4,514,976 | 5/1985 | Cristoff | 60/39.183 |
| 5,511,374 | 4/1996 | Glickstein et al. | 60/39.183 |

OTHER PUBLICATIONS

*Saving Energy in Compressed Air System*, Ishikawajima–Harima Technical Report, vol. 22, No. 6, pp. 427–432, published Nov. 1982.

*Large Combines Steam and Gas Turbine Plant (Auto–Stag)*, Hitachi Review, vol. 56, No. 11, pp. 47–52, published Nov. 1974.

Primary Examiner—Louis J. Casaregola
Attorney, Agent, or Firm—Wenderoth, Lind & Ponack

[57] ABSTRACT

An energy supply system includes a gas turbine which drives an air compressor. Heat generated by adiabatic compression of air in the air compressor is recovered by a heat exchanger. The air from which the heat has been recovered is used to operate an air turbine. The air turbine drives a generator. Adiabatic expansion of the air in the air turbine produces air at low temperature. Thermal energy at low temperature of the air is recovered by another heat exchanger. The waste heat from the gas turbine is recovered by a boiler system of a heat recovery type.

8 Claims, 2 Drawing Sheets

ENERGY SUPPLY SYSTEM UTILIZING GAS AND STEAM TURBINES

BACKGROUND OF THE INVENTION

1. Field of the Invention

The present invention relates to an energy supply system utilizing a gas turbine. As an energy supply system utilizing a gas turbine, a cogeneration system and a combined-cycle power generation system are known.

The cogeneration system supplies both of electric energy (electric power) and thermal energy in the form of steam. Such a cogeneration system utilizing a gas turbine is particularly suitable, in industrial use, for the paper and pulp industry, food industry and so on wherein a large quantity of process steam is consumed, and, in individual use, for area-wide air conditioning systems (cooling and heating systems) of large scale, hospitals, hotels, and an artificial health spa, for example.

The combined-cycle power generation system is particularly suitable for supplying electric energy or electric power in the case where heat energy is not required at all, or in a case where electric energy is mainly required. In industrial use, the combined-cycle power generation system is suitable, for example, for a private power generation system in a factory.

2. Description of the Prior Art

An energy supply system utilizing a gas turbine of prior art is so constructed that electric power is generated by a generator which is directly driven by a gas turbine, and steam which is generated in an exhaust gas boiler using the exhaust gas from the gas turbine is utilized in the energy demand side.

In such a prior art cogeneration system utilizing a gas turbine, the steam generated in the exhaust gas boiler per se is used in process heating and room heating.

In a combined-cycle power generation system utilizing a gas turbine of prior art, the above steam which is generated in the exhaust gas boiler is used to operate a steam turbine which, in turn, drives an electric power generator. The waste steam from the steam turbine is cooled in a condenser.

There are two kinds of thermal energy demand, one is thermal energy at high temperature and the other is thermal energy at low temperature. As for the low temperature thermal energy, in the prior art cogeneration system utilizing a gas turbine, cold water is produced by a turbo refrigerator which uses electric energy obtained by a generator driven by a gas turbine power generation, or produced by an absorption refrigerator using steam. This cold water is used, for example, in an air conditioning system such as in room cooling.

The prior art energy supply system utilizing a gas turbine, the generator is driven directly by the torque from the gas turbine, as mentioned above. In the present circumstances, however, the prior art energy supply system utilizing a gas turbine does not sufficiently meet various requirements on the energy demand side.

In an area-wide air conditioning system, for example, thermal energy is mainly demanded and electric energy is less demanded. It is noted, however, that the prior art cogeneration system in which the generator is driven directly by the gas turbine mainly produces electric energy. Therefore, such a prior art system is not capable of performing appropriate energy supply to meet a real balance of energy demand. Accordingly, it is desirable to provide an energy supply system which is used as a cogeneration system of a thermal energy dominant type which is capable of efficient energy supply to meet a particular balance of energy demand.

It has been necessary for the prior art cogeneration system utilizing a gas turbine to employ expensive and complicated equipment such as a turbo refrigerator or an absorption refrigerator, in order to obtain thermal energy at low temperatures. Accordingly, it is desired to reduce the cost of equipment for obtaining thermal energy at low temperatures.

Prior art combined-cycle power generation system is a combination of a gas turbine, an exhaust gas boiler, a steam turbine, and so on, each of which is large in size in order to increase efficiency thereof. Further, a large quantity of cooling water is used in a condenser and, therefore, the site condition of the system is liable to be restricted to a place near a sea shore or a river, otherwise, a large-sized cooling tower is required. An electrically powered fan, which is used in the cooling tower, consumes high quantities power, thus causing a great loss in electric energy. Accordingly, it is desired to provide a combined-cycle generation system which is not restricted in location thereof, which is of a small or medium size, and which presents improved efficiency.

SUMMARY OF THE INVENTION

An object of the present invention is to provide an energy supply system in which a gas turbine drives, not a generator but an air compressor so as to translate all of the energy output from the gas turbine into thermal energy and, thereby, to meet various requirements on the energy demand side.

In accordance with the present invention, there is provided an energy supply system including a gas turbine means in which combustion takes place to produce torque, and an air compressor which is connected to the gas turbine means. The air compressor is driven by the torque from the gas turbine to adiabatically compress air to produce a high temperature air under pressure.

The energy supply system further includes a first thermal energy supply means and a second thermal energy supply means, each of which supply thermal energy at high temperature. The first thermal energy supply means is connected to the gas turbine means and adapted to collect or recover heat or thermal energy from an exhaust gas from the gas turbine. The second thermal energy supply means is connected to the air compressor to receive the high temperature air under pressure and adapted to collect or recover heat or thermal energy from the high temperature air under pressure.

The energy supply system further includes drive means, and first electric energy supply means which are driven by a torque from the drive means. The first electric energy supply means includes a generator. The drive means is adapted to receive air under pressure from the second thermal energy supply means after the heat has been recovered from the high temperature air under pressure at the second thermal energy supply means. The drive means is adapted to adiabatically expand the air under pressure so as to produce a torque by which the first electrical energy supply means is driven.

Lastly, the energy supply system includes third thermal energy supply means for supplying thermal energy at low temperature. The third thermal energy supply means is adapted to receive air from the drive means after the air under pressure has been adiabatically expanded.

In the case where the present invention is applied to a cogeneration system, the first thermal energy supply means preferably include a boiler system of a heat recovery type having an exhaust gas boiler and an afterburner located at an upstream portion of the exhaust gas boiler. The afterburner is adapted to burn a quantity of fuel with residual oxygen in the exhaust gas from the gas turbine means, so as to increase the amount of steam produced in the exhaust gas boiler, and so as to translate the steam into a superheated steam having higher pressure and higher temperature. The energy supply system preferably further includes a back pressure steam turbine adapted to receive the superheated steam from the first thermal energy supply means and adapted to be operated by the superheated steam to produce a torque, and a second electrical energy supply means for supplying electrical energy. The second electrical energy supply means may include a generator which is adapted to be driven by the torque from the back pressure steam turbine. The back pressure steam turbine may produce, as waste steam, steam at intermediate pressure.

The drive means may include an air turbine.

In this case, the third thermal energy supply means may include a heat exchanger which performs heat exchange action between a feed liquid and the air from the air turbine the temperature of which has been lowered by the adiabatic expansion in the air turbine below the temperature of the feed liquid. The feed liquid may include an antifreeze solution.

Alternatively, the third thermal energy supply means may include a duct for conveying air, the temperature of which has been lowered by the adiabatic expansion of the air under pressure in the air turbine, to an energy demand side.

Preferably, the second thermal energy supply means includes a heat exchanger which performs heat exchange action between a cooling water and the high temperature air under pressure to collect hot water. The high temperature air under pressure has been obtained from the adiabatic compression by the air compressor.

In this case, the hot water from the heat exchanger of the second thermal energy supply means may be supplied, as a boiler feedwater, to the boiler system of heat recovery type.

In the case where the present invention is applied to a combined-cycle generation system, the first thermal energy supply means may include a boiler system of a heat recovery type having an exhaust gas boiler, and the energy supply system may further include a steam turbine adapted to receive steam from the exhaust gas boiler and adapted to be operated by the steam to produce a torque, second electrical energy supply means for supplying an electrical energy, and a condenser for condensing waste steam from the steam turbine. The second electrical energy supply means may include a generator which is adapted to be driven by the torque from the steam turbine. The thermal energy at low temperatures is supplied by the third thermal energy supply means and can be used for cooling the waste steam in the condenser.

The drive means may include an air turbine.

In this case, the third thermal energy supply means preferably include a heat exchanger which performs heat exchange action between a feed liquid and the air from the air turbine the temperature of which has been lowered by the adiabatic expansion in the air turbine below the temperature of the feed liquid, and the feed liquid may include an antifreeze solution.

Preferably, the feed liquid is repeatedly circulated between the heat exchanger of the third thermal energy supply means and the condenser.

Preferably, the second thermal energy supply means includes a heat exchanger which performs heat exchange action between a cooling water and the high temperature air under pressure to collect hot water. The high temperature air under pressure has been obtained from the adiabatic compression by the air compressor.

The hot water from the heat exchanger of the second thermal energy supply means can be supplied, as a boiler feedwater, to the boiler system of a heat recovery type.

In this case, the waste steam which has been cooled in the condenser and translated into water is preferably supplied, as aforesaid cooling water, to the heat exchanger of the second thermal energy supply means and may be repeatedly circulated among the heat exchanger of the second thermal energy supply means, the boiler system of heat recovery type, the steam turbine and the condenser.

The boiler system of heat recovery type may include an afterburner located at an upstream portion of the exhaust gas boiler. The afterburner may be adapted to burn a quantity of fuel with residual oxygen in the exhaust gas from the gas turbine means, so as to increase the amount of a steam produced in the exhaust gas boiler, and so as to translate the steam into a superheated steam having a higher pressure and temperature. The steam turbine may be a mixed pressure steam turbine adapted to receive a low pressure steam and a high pressure steam both from the boiler system of heat recovery type and may be adapted to be operated by both of the low pressure steam and the high pressure steam.

It is to be noted that an "air compressor" is used herein with the understanding that it may include a "gas compressor" which is employed in a case where gases other than air are used.

The feature in operation of the energy supply system utilizing a gas turbine of the invention (i.e., the cogeneration system and the combined-cycle generation system) resides in the fact that, unlike the prior art system in which the generator is driven directly by the gas turbine, all of the energy output from the gas turbine is once recovered as thermal energy.

In the energy supply system used as a cogeneration system utilizing a gas turbine, the gas turbine directly drive the air compressor, so as to adiabatically compress air to produce air under pressure. The temperature of the air under pressure produced by adiabatic compression is increased. The heat or thermal energy of the high temperature air under pressure is recovered by the second thermal energy supply means. Typically, a heat exchanger of the second thermal energy supply means perform heat exchange action between the high temperature air under pressure and the cooling water. Thus, most of the energy having been input to the air compressor is recovered as hot water.

The air under pressure from which heat or thermal energy has been recovered is used in operating rotating means including an air turbine (such as a radial turbine) or an air motor, for example. The air under pressure is ejected from a nozzle, for example, so as to be completely expanded in the turbine under atmospheric pressure as a back pressure. As the air under pressure flows through the nozzle, its pressure energy is translated into kinetic energy. The air turbine is operated at a high speed by means of the air under high pressure, so as to drive a generator. As the air under pressure flows from the nozzle through the turbine chamber, it is expanded adiabatically, so that the internal energy of the air under pressure is reduced by the amount of the kinetic energy consumed in the air turbine. As a result, the air is reduced in temperature so that an air at low temperature is obtained. Although the low temperature air may be used in its this state, it is also possible that a heat exchange action is performed between the low temperature air and a feedliquid of higher temperature, so as to produce a cold liquid. The waste heat from the gas turbine is recovered by the first thermal energy supply means (typically, by a boiler system of heat recovery type). The waste heat which has been recovered can be fed through a duct to the energy demand side for use.

In the case where the boiler system of heat recovery type of the first thermal energy supply means is provided with the exhaust gas boiler and the afterburner located upstream of the exhaust gas boiler, the aforesaid hot water is translated into saturated steam in the exhaust gas boiler. The afterburner (typically, a ducted burner) burns a quantity of fuel with the residual oxygen in the waste gas from the gas turbine, so as to increase steam output from the exhaust gas boiler, and to heat the saturated steam from the exhaust gas boiler to translate it to superheated steam of higher pressure and higher temperature. The superheated steam is used to operate the back pressure steam turbine. The back pressure steam turbine in turn drives the second generator so as to produce electric energy. A waste steam from the steam turbine is recovered as an intermediate pressure steam (depressurized steam). This intermediate pressure steam can be used in process heating, room heating in an area-wide air conditioning system or supplying hot water.

The exhaust gas boiler of the boiler system of heat recovery type can use the hot water, as a feedwater, which has been obtained in the second thermal energy supply means.

In the case where the third thermal energy supply means for supplying thermal energy at low temperature include the heat exchanger which performs the heat exchange action between the air of low temperature and the feedliquid of higher temperature, it is possible that the feedliquid contains an antifreezing liquid (for example, glycols, such as ethylene glycol) so as to prevent piping for the feedliquid from freezing.

In the energy supply system of subject invention as a combined-cycle generation system, the gas turbine also directly drives the air compressor, so as to produce air under pressure. Heat of the air under pressure is recovered by the second thermal energy supply means (typically, a heat exchanger) as a quantity of hot water. This hot water may be used as feedwater for the exhaust gas boiler of the boiler system of a heat recovery type. The air under pressure from which heat has been recovered is used to operate the aforesaid rotating means. The rotating means in turn drives the generator. The air which has been adiabatically expanded by the rotating means has thermal energy at low temperature. This thermal energy at low temperature is recovered by the third thermal energy supply means.

The steam from the exhaust gas boiler is used to operate the steam turbine. The steam turbine in turn drives the second generator. The waste steam from the steam turbine is cooled in the condenser. At this stage, the thermal energy at low temperature obtained in the third thermal energy supply means is used in cooling the waste steam in the condenser.

In the case where the boiler system of a heat recovery type is provided with the afterburner and the steam turbine is a mixed-pressure steam turbine, the mixed-pressure steam turbine is operated by low pressure steam and high pressure steam both from the boiler system of heat recovery type.

The energy supply system utilizing a gas turbine according to the present invention is of system wherein the energy output from the gas turbine in its entirety is once recovered as heat energy or thermal energy. This satisfies various requirements on the energy demand side which have not been sufficiently met by conventional energy supply systems wherein the generator is directly driven by the gas turbine.

Specifically, in the case where the energy supply system according to the present invention is used as a cogeneration system utilizing a gas turbine, it is possible to efficiently perform energy supply so as to meet a balance in energy demand of a particular application wherein thermal energy is mainly required, such as area-wide air conditioning systems (cooling and heating), paper mills, pulp mills, food industries, and so on.

Comparing the cogeneration system according to the invention with a conventional cogeneration system wherein the generator is directly driven by the gas turbine, in terms of the total energy output, the amount of energy recovered from the exhaust gas from the gas turbine is substantially the same. The electric power obtained by the generator which is directly driven by the output from the gas turbine in prior art cogeneration system is substantially equivalent to the thermal energy recovered from the high temperature air under pressure which is produced by the air compressor driven by most of the output from the gas turbine in the cogeneration system according to the present invention. The difference between the two cogeneration systems exists in the fact that the cogeneration system of the present invention is capable of increasing the total energy output, as compared with the prior art cogeneration system, by the amount of the electric power obtained by the generator which is driven by the rotating means which is operated by the air under pressure, and the amount of the thermal energy at low temperature obtained by adiabatic expansion of the air under pressure.

In accordance with the cogeneration system of the present invention, it is possible to obtain liquid at low temperatures, typically by a heat exchanger, without using expensive and complicated equipment, such as a turbo refrigerator or an absorption refrigerator. Therefore, the cost of the equipment can be significantly reduced.

In the case where the energy supply system of the invention is used as a combined-cycle generation system, the electric power is obtained by the generator driven by the steam turbine, and is obtained by the generator driven by the air turbine which is operated by the air under pressure produced by the air compressor which is driven by the gas turbine. At the same time, the adiabatic expansion of the air under pressure in the air turbine produces a large amount of the thermal energy at low temperature. This thermal energy at low temperature can be used in condensing the waste steam from the steam turbine. Therefore, a large quantity of cooling liquid can be saved. This eliminates the dependence on sea water or river water as a cooling water which have been used heretofore. Therefore, the site requirements of the system are avoided and, the site is not restricted to a location near the sea shore or a river. It is also unnecessary to provide equipment for taking thereinto cooling water from a sea or a river, or a large-sized cooling tower. This leads to reduction in power consumption. The possible requirement for a backup cooling tower or an external source of cooling liquid is minimized, even if a large quantity of electric power is demanded.

PREFERRED EMBODIMENTS

Figure 1:
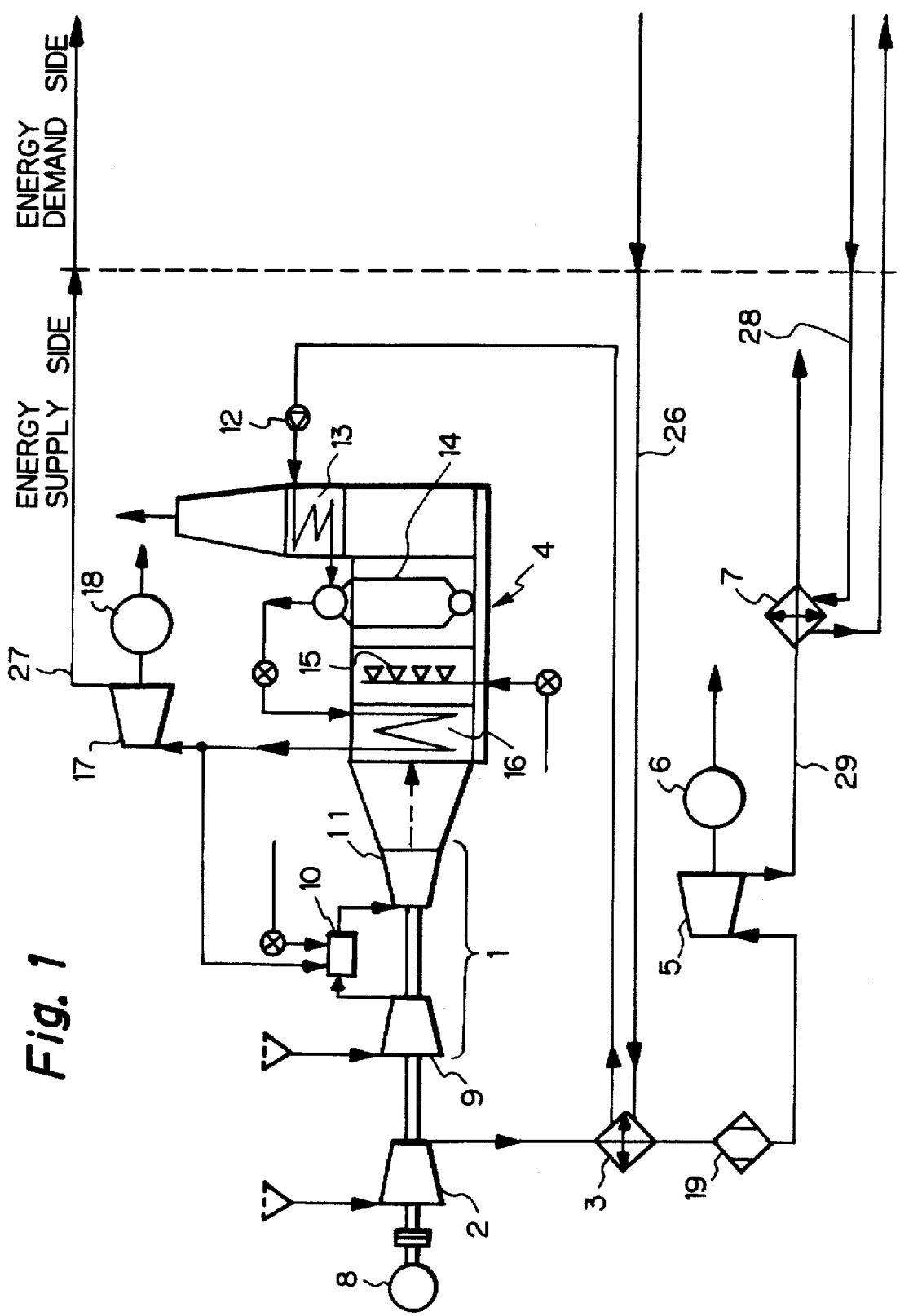
FIG. 1 is a diagrammatic view showing a cogeneration system according to one embodiment of an energy supply system of the present invention.

FIG. 1 illustrates diagrammatically a cogeneration system according to one embodiment of an energy supply system utilizing a gas turbine of the present invention. The cogeneration system includes, in principle, a gas turbine system 1, an air compressor 2 connected to the gas turbine system 1, a heat exchanger 3 connected to the air compressor 2, a boiler system 4 of a heat recovery type connected to the gas turbine system 1, an air turbine 5 connected to the heat exchanger 3, a generator 6 connected to the air turbine 5, and a heat exchanger 7 connected to the air turbine 5.

In the gas turbine system 1, combustion takes place to produce a torque. The air compressor 2 is driven by the torque from the gas turbine produced by system 1 to adiabatically compress air to produce a high temperature air under pressure. The heat exchanger 3 receives the high temperature air under pressure from the air compressor 2 and collects or recovers heat or thermal energy from this high temperature air under pressure. The boiler system 4 receives the exhaust gas from the gas turbine system 1 and collects or recovers heat or thermal energy from this exhaust gas. The air turbine 5 receives the air under pressure from the heat exchanger 3 after the heat or thermal energy has been recovered from the air under pressure in the heat exchanger 3. The air turbine 5 is operated by the air under pressure to produce a torque and, at the same time, to adiabatically expand the air under pressure to produce a lowered temperature air. The generator 6 is driven by the torque from the air turbine 5. The heat exchanger 7 receives the air of lowered temperature from the air turbine 5 and collects or recovers thermal energy at low temperature from the air of lowered temperature.

The gas turbine system 1 is initially operated by a starter motor 8. A quantity of fuel is mixed with air which has been compressed in an air supply compressor 9 of the gas turbine system 1 and is burned in a combustor 10 to produce a high temperature gas under high pressure. This high temperature and high pressure gas drives a gas turbine 11 of the gas turbine system 1.

The air compressor 2 is operated by the gas turbine 11 the output shaft of which is connected to the air compressor 2. Inlet air to the air compressor 2 is adiabatically compressed therein to produce a high temperature air under pressure. This high temperature air under pressure is supplied to the heat exchanger 3 in which heat exchange action is performed between the high temperature air under pressure and a cooling water supplied through a feedwater duct 26. Thus, the energy having been input to the air compressor 2, in its substantial portion, is recovered in the form of hot water.

The hot water thus obtained is supplied, as a boiler feedwater, to an economizer 13 of the boiler system 4 by a feedwater pump 12. The hot water thus supplied to the economizer 13 is heated therein and supplied to a boiler 14. In the boiler 14, the heated hot water is changed into a saturated steam at high temperature.

A ducted burner 15 is located in an upstream portion of the boiler system 4 to constitute an afterburner. In the ducted burner 15, a quantity of fuel from a fuel supply is burned with residual oxygen in the exhaust gas from the gas turbine 11. Due to this afterburning, an increased amount of saturated steam is produced, and the saturated steam is translated in a superheater 16 into a superheated steam of high pressure and high temperature.

This superheated steam is supplied to a back pressure steam turbine 17 and used to operate it. The steam turbine 17 drives a second generator 18 to produce electric power. At the same time, the waste steam, from the steam turbine 17, is recovered as a stream of depressurized steam at a medium pressure. This depressurized steam is supplied through a duct 27 to the energy demand side and is utilized in process heating, room heating in an area-wide air conditioning system, or hot water supplying.

The air under pressure, after the heat thereof has been recovered in the heat exchanger 3, is then dehumidified in a drier 19 and supplied to the air turbine 5. The air under pressure operates the air turbine 5 which in turn drives the generator 6 to produce electric power.

In this connection, it is to be noted that an air motor (not shown) may be used in place of the air turbine 5.

The air having experienced an adiabatic expansion in the turbine 5 is reduced in temperature to become a cold air or an air at low temperature. In the heat exchanger 7, heat exchange action is performed between the cold air from the air turbine 5 and a feedliquid of higher temperature supplied through a duct 28 so as to produce a cold liquid or a liquid at low temperature. In this case, the heat exchanger 7 serves as means for recovering and supplying a thermal energy at low temperature. Alternatively, a duct 29 from the air turbine 5 may be extended so as to bypass the heat exchanger 7 to the energy demand side and the cold air may be used directly on the energy demand side without performing the above heat exchange action. In such a case, the duct 29 or the like for conveying the cold air to the energy demand side serves as a means for recovering and supplying a thermal energy at low temperature. The cold liquid or the cold air may be used in room cooling or the like. The feedliquid may be an antifreeze solution.

Figure 2:
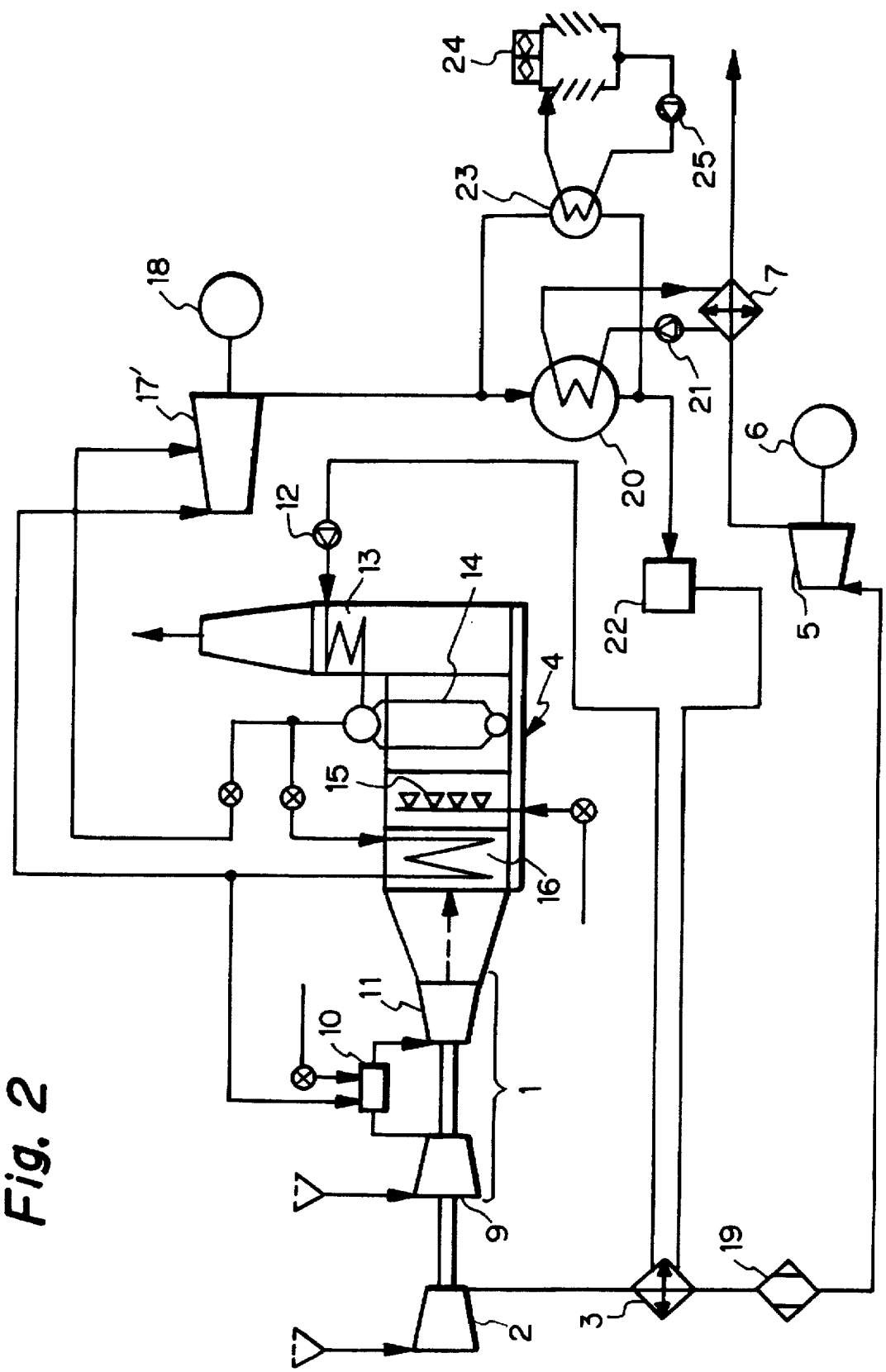
FIG. 2 is a diagrammatic view showing a combined-cycle power generation system according to another embodiment of an energy supply system of the present invention.

FIG. 2 illustrates diagrammatically a combined-cycle generation system according to one embodiment of an energy supply system utilizing a gas turbine of the present invention. The basic construction and operation of this embodiment is substantially the same as those of the cogeneration system of FIG. 1. Accordingly, the parts identical to those in the embodiment of FIG. 1 are designated by the same reference characters, and therefore, only the different points will be explained below.

In the embodiment of FIG. 2, a mixed-pressure steam turbine 17' is employed as a steam turbine. In the boiler 14 of the boiler system 4, steam at relatively low pressure is produced. A portion of the steam at relatively low pressure is supplied directly to the mixed-pressure steam turbine 17', and the remaining portion of the relatively low pressure steam is supplied to the superheater 16 and is translated thereat into a superheated steam at high pressure. The superheated steam at high pressure is then supplied to the mixed-pressure steam turbine 17'. In such a case where the boiler system 4 is divided into a low pressure part and a high pressure part as in the illustrated embodiment, the temperature of the heat receiving side in the low pressure part can be reduced, as compared with the case where only the high pressure steam is used. Therefore, the overall efficiency of the apparatus may be increased.

The waste steam from the mixed-pressure steam turbine 17' is supplied to a condenser 20. This is in contrast to the cogeneration system of FIG. 1 wherein such waste steam is utilized on the energy demand side, for example in process heating or the like. The cold liquid obtained in the heat exchanger 7 is utilized in the condenser 20 as a cooling liquid for cooling the waste steam from the mixed-pressure steam turbine 17' to translate it into water. This is also in contrast with the cogeneration system of FIG. 1 wherein such cold liquid is utilized on the energy demand side. The cooling liquid is heated in the condenser 20 and then is supplied to the heat exchanger 7 by means of a liquid supply pump 21 for repetitive use. The exhaust steam from the steam turbine 17' is cooled in the condenser 20 and translated into water. This water is supplied to a deaerator 22 for deaeration thereof, and then supplied to the heat exchanger 3 for repetitive use.

When the condenser 20 is reduced in its ability to an insufficient value, a backup condenser 23 and a cooling tower fan 24 as illustrated would be operated.

What is claimed is:

1. An energy supply system comprising:

a gas turbine system in which combustion takes place to produce a first torque and an exhaust gas;

a boiler system connected to said gas turbine system, said boiler system adapted to collect heat from the exhaust gas;

an air compressor connected to said gas turbine system, said air compressor being driven by the first torque and capable of compressing air so as to produce a first air flow which is under pressure and has a higher temperature than the air prior to being compressed;

a first heat exchanger connected to said air compressor, said first heat exchanger adapted to receive cold water, transfer heat from said first air flow to the cold water, and thereby produce hot water and a second air flow under pressure;

a drive means connected to said first heat exchanger, said drive means adapted to expand the second air flow from said first heat exchanger so as to produce a second torque and a third air flow at a temperature which is lower than the temperature of the second air flow; and a first generator connected to said drive means and being driven by the second torque produced by said drive means in order to produce electrical energy.

2. The energy supply system as claimed in claim 1, further comprising:

a back pressure steam turbine connected to said boiler system; and a second generator connected to said back pressure steam turbine, wherein the exhaust gas from said gas turbine system includes residual oxygen, said boiler system includes an exhaust gas boiler, connected to said first heat exchanger, and an afterburner located in an upstream position relative to said exhaust gas boiler, said exhaust gas boiler is capable of producing a first steam, said afterburner is capable of burning a quantity of fuel with the residual oxygen in the exhaust gas from said gas turbine system so as to increase the amount of the first steam produced in said exhaust gas boiler and to translate the first steam to a superheated steam having a higher pressure and a higher temperature than the first steam, said back pressure steam turbine is capable of receiving said superheated steam from said boiler system to produce a third torque, said second generator is driven by the third torque so as to produce electrical energy, and said back pressure turbine produces, as a waste steam, a second steam at an intermediate pressure.

3. The energy supply system as claimed in claim 1, wherein said drive means comprises an air turbine.

4. The energy supply system as claimed in claim 1, further comprising a second heat exchanger connected to said drive means, said second heat exchanger being capable of receiving a feedliquid which includes an antifreeze solution, and transfering heat from said feedliquid to the third air flow to produce a cold liquid.

5. The energy supply system as claimed in claim 1, wherein said first heat exchanger is connected to said boiler system such that the hot water from said first heat exchanger is supplied, as boiler feedwater, to said boiler system.

6. The energy supply system as claimed in claim 5, further comprising:

a mixed pressure steam turbine connected to said boiler system; and a second generator connected to said mixed pressure steam turbine.

7. An energy supply system comprising:

a gas turbine system in which combustion takes place to produce a first torque and an exhaust gas;

a boiler system connected to said gas turbine system, said boiler system adapted to collect heat from the exhaust gas;

a gas compressor connected to said gas turbine system, said gas compressor being driven by the first torque and capable of compressing gas so as to produce a first gas flow which is under pressure and has a higher temperature than the gas prior to being compressed;

a first heat exchanger connected to said gas compressor, said first heat exchanger adapted to receive cold water, transfer heat from the first air flow to the cold water, and to thereby produce hot water and a second gas flow under pressure;

a drive means connected to said first heat exchanger, said drive means adapted to expand the second gas flow from said first heat exchanger so as to produce a second torque and a third gas flow at a temperature which is lower than the temperature of the second gas flow; and a first generator connected to said drive means and being driven by the second torque produced by said drive means in order to produce electrical energy.

8. The energy supply system as claimed in claim 7, further comprising:

a mixed pressure steam turbine connected to said boiler system; and a second generator connected to said mixed pressure steam turbine.

* * * * *